(12) United States Patent
Joo et al.

(10) Patent No.: US 12,531,478 B2
(45) Date of Patent: Jan. 20, 2026

(54) CIRCUIT AND METHOD FOR PREVENTING POWER IMBALANCE OF RESONANCE-TYPE POWER CONVERTER

(71) Applicant: KOREA ELECTRONICS TECHNOLOGY INSTITUTE, Seongnam-si (KR)

(72) Inventors: Dong Myoung Joo, Bucheon-si (KR); Jun Hyuk Choi, Bucheon-si (KR); Joon Sung Park, Seoul (KR); Jin Hong Kim, Suwon-si (KR); Byong Jo Hyon, Anyang-si (KR); Yong Su Noh, Seoul (KR); Sang Min Park, Bucheon-si (KR); Dae Yeon Hwang, Incheon (KR); Hyoung Kyu Yang, Seoul (KR); Poo Reum Jang, Incheon (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 238 days.

(21) Appl. No.: 18/528,368

(22) Filed: Dec. 4, 2023

(65) Prior Publication Data

US 2024/0195293 A1 Jun. 13, 2024

(30) Foreign Application Priority Data

Dec. 27, 2022 (KR) .................. 10-2022-0185866

(51) Int. Cl.
*H02M 3/00* (2006.01)
*H02M 1/00* (2006.01)
*H02M 3/335* (2006.01)

(52) U.S. Cl.
CPC .......... *H02M 3/01* (2021.05); *H02M 1/0009* (2021.05); *H02M 1/0012* (2021.05);
(Continued)

(58) Field of Classification Search
CPC .... H02M 3/01; H02M 1/0009; H02M 1/0012; H02M 1/007; H02M 1/0074;
(Continued)

(56) References Cited

U.S. PATENT DOCUMENTS 6,297,976 B1 * 10/2001 Isono ................ H02M 3/33553
363/71
6,838,856 B2 * 1/2005 Raichle ..................... H02J 7/02
320/121

(Continued)

FOREIGN PATENT DOCUMENTS

| JP | H11-285249 A | 10/1999 |
| JP | 2015-119513 A | 6/2015 |
| JP | WO2020/129122 A1 | 2/2021 |

OTHER PUBLICATIONS

Office Action received in Korean Application No. 10-2022-0185866 dated Mar. 15, 2024 in 5 pages.
(Continued)

*Primary Examiner* — Yusef A Ahmed
(74) *Attorney, Agent, or Firm* — Knobbe, Martens, Olson & Bear, LLP

(57) ABSTRACT

A circuit for preventing power imbalance of a resonance-type power converter is proposed. The circuit may include a rectifier converting input alternating current (AC) into direct current (DC) and frequency-controlled first and second resonant converter modules configured to receive an output voltage of the rectifier divided into two stages. The circuit may further include a controller outputting a first frequency command for controlling a frequency of a pulse width modulation (PWM) signal supplied to a switching element of a first switching unit of the first resonant converter module. The circuit may further include a frequency compensator compensating for the first frequency command and then outputting a second frequency command for controlling
(Continued)

a frequency of a PWM signal supplied to a switching element of a second switching unit of the second resonant converter module, so as to eliminate power imbalance between the first and second resonant converter modules.

3 Claims, 5 Drawing Sheets

(52) U.S. Cl.
CPC .......... *H02M 1/007* (2021.05); *H02M 1/0074* (2021.05); *H02M 1/008* (2021.05); *H02M 3/33573* (2021.05)

(58) Field of Classification Search
CPC ............. H02M 1/008; H02M 3/33573; H02M 1/0016; H02M 1/08; H02M 3/1566
See application file for complete search history.

(56) References Cited

U.S. PATENT DOCUMENTS

| | | | | |
|---|---|---|---|---|
| 8,576,591 | B2 * | 11/2013 | Phadke | H02J 1/10 363/124 |
| 9,006,930 | B2 * | 4/2015 | Jang | H02J 4/00 307/82 |
| 9,484,746 | B2 * | 11/2016 | Tang | H02J 3/381 |
| 2003/0173930 | A1 * | 9/2003 | Na | H02P 1/00 318/772 |
| 2009/0102285 | A1 * | 4/2009 | Haga | H02M 1/12 307/31 |
| 2011/0013440 | A1 * | 1/2011 | Mechi | H02M 1/4216 363/152 |
| 2012/0007512 | A1 * | 1/2012 | Kim | H05B 45/40 315/152 |
| 2012/0300501 | A1 * | 11/2012 | Kojima | H02M 3/33576 363/17 |
| 2015/0372614 | A1 * | 12/2015 | Yamada | H02M 3/156 363/89 |
| 2016/0197555 | A1 * | 7/2016 | Figge | H02J 1/102 363/65 |
| 2016/0301305 | A1 * | 10/2016 | Yamada | H02M 7/06 |
| 2019/0052180 | A1 * | 2/2019 | Meneses Herrera | H02M 3/33592 |
| 2019/0190276 | A1 * | 6/2019 | Liu | H02J 3/46 |
| 2019/0348903 | A1 * | 11/2019 | Yamada | H02M 7/219 |
| 2020/0195144 | A1 * | 6/2020 | Gekinozu | H02M 3/01 |
| 2021/0021224 | A1 * | 1/2021 | Niimura | H02M 7/49 |
| 2021/0408918 | A1 * | 12/2021 | Sigamani | H02M 1/0058 |
| 2022/0103080 | A1 * | 3/2022 | Yang | H02M 1/0009 |
| 2023/0076369 | A1 * | 3/2023 | Zhou | H02M 1/4216 |
| 2023/0307921 | A1 * | 9/2023 | Zhang | H02J 3/381 |
| 2024/0146201 | A1 * | 5/2024 | Cobos Marquez | H02M 1/0058 |
| 2024/0217358 | A1 * | 7/2024 | Wan | H02M 3/33584 |
| 2025/0158529 | A1 * | 5/2025 | Suzuki | H02M 3/01 |

OTHER PUBLICATIONS

Notice of Allowance received in Korean Application No. 10-2022-0185866 dated Nov. 7, 2024.

* cited by examiner

FIG. 1 - *Prior Art*
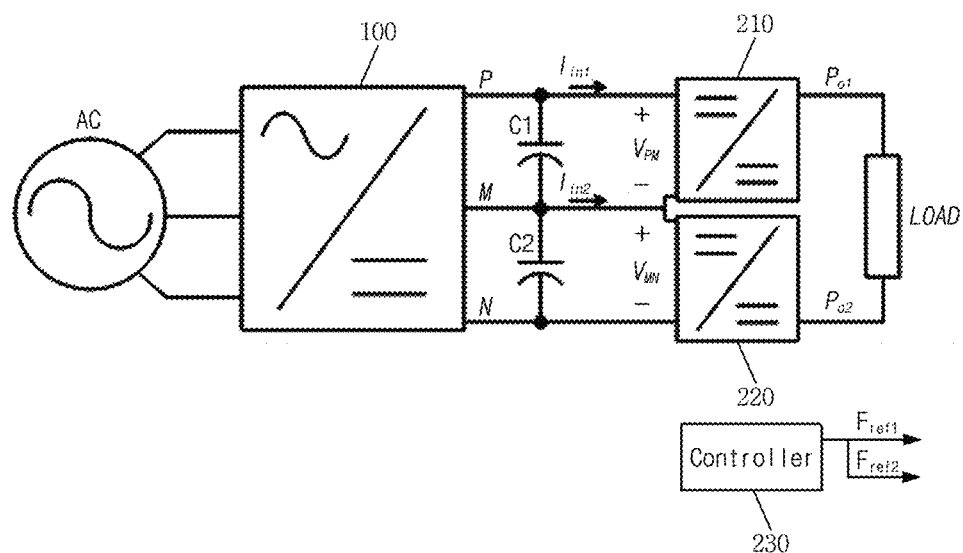
FIG. 2 - *Prior Art*
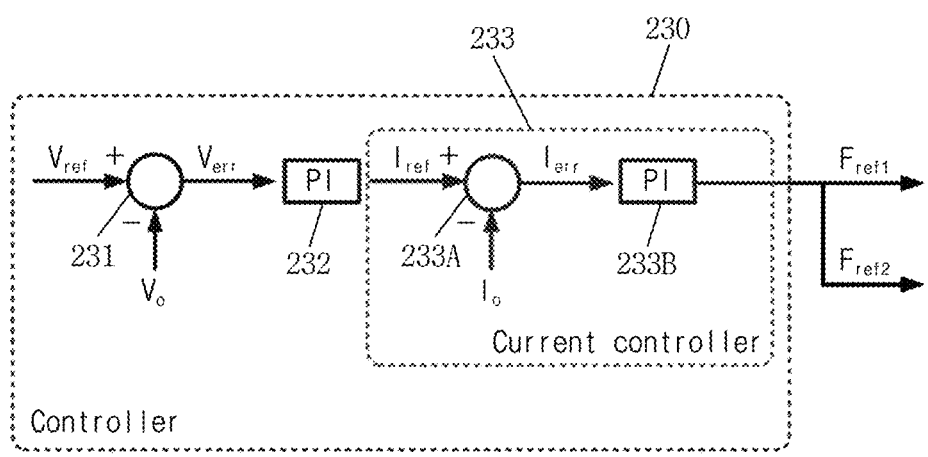

(a)　　　　　　　　　　　(b)

CIRCUIT AND METHOD FOR PREVENTING POWER IMBALANCE OF RESONANCE-TYPE POWER CONVERTER

CROSS REFERENCE TO RELATED APPLICATIONS

The present application claims priority to Korean Patent Application No. KR 10-2022-0185866 filed Dec. 27, 2022, the entire contents of which are incorporated herein for all purposes by this reference.

TECHNICAL FIELD

The present disclosure relates to technology for resolving power imbalance in a resonance-type power converter. In particular, the present disclosure relates to a circuit and method that can eliminate power imbalance by controlling frequency-controlled resonant converter modules having different resonance points with different frequencies in a resonance-type power converter.

SUMMARY

One aspect is a circuit and method for eliminating power imbalance between two frequency-controlled resonant converter modules having different resonance points by controlling the resonant converter modules with different frequency commands in a resonance-type power converter.

Another aspect is a circuit for preventing power imbalance of a resonance-type power converter that may include a rectifier converting input alternating current (AC) into direct current (DC); frequency-controlled first and second resonant converter modules to which an output voltage of the rectifier divided into two stages are input; a controller outputting a first frequency command for controlling a frequency of a pulse width modulation (PWM) signal supplied to a switching element of a first switching unit of the first resonant converter module; and a frequency compensator compensating for the first frequency command and then outputting a second frequency command for controlling a frequency of a PWM signal supplied to a switching element of a second switching unit of the second resonant converter module, whereby eliminating power imbalance between the first and second resonant converter modules.

In the circuit, the frequency compensator may include a subtractor obtaining a difference between a first sensing current sensed from the first switching unit of the first resonant converter module and a second sensing current sensed from the second switching unit of the second resonant converter module; a proportional-integral (PI) controller proportionally integrating the difference and outputting a frequency compensation component accordingly; and an adder adding the frequency compensation component to the first frequency command and outputting the second frequency command accordingly.

In the circuit, the first sensing current may be sensed by a first sensing circuit connected to an output terminal of the first switching unit of the first resonant converter module, and the second sensing current may be sensed by a second sensing circuit connected to an output terminal of the second switching unit of the second resonant converter module.

In the circuit, the first sensing circuit and the second sensing circuit may have same configuration, and each of the first and second sensing circuits may include a current transformer driven by an output current of the first switching unit; a diode rectifier converting an AC component output through the current transformer into a DC component; and an RC filter extracting an average value of the DC component output from the diode rectifier and outputting the first or second sensing current.

In the circuit, the sensing current may be a value representing the DC component corresponding to a peak value of a primary resonance current of the current transformer.

Another aspect is a method for preventing power imbalance of a resonance-type power converter that may include a resonant converter module preparation step in which frequency-controlled first and second resonant converter modules that divide an output voltage of a rectifier into two stages are prepared; a first frequency command output step in which a controller of a frequency compensation type controller outputs a first frequency command for controlling a frequency of a pulse width modulation (PWM) supplied to a switching element of a first switching unit of the first resonant converter module; and a second frequency command output step in which a frequency compensator of the frequency compensation type controller compensates for the first frequency command and then outputs a second frequency command for controlling a frequency of a PWM signal supplied to a switching element of a second switching unit of the second resonant converter module in order to remove power imbalance between the first and second resonant converter modules.

BRIEF DESCRIPTION OF THE DRAWINGS

FIG. 1 is a block diagram illustrating a typical resonance-type power converter.

FIG. 2 is a block diagram illustrating a high-frequency inverter included in a typical resonance-type power converter.

DETAILED DESCRIPTION

Figure 3:
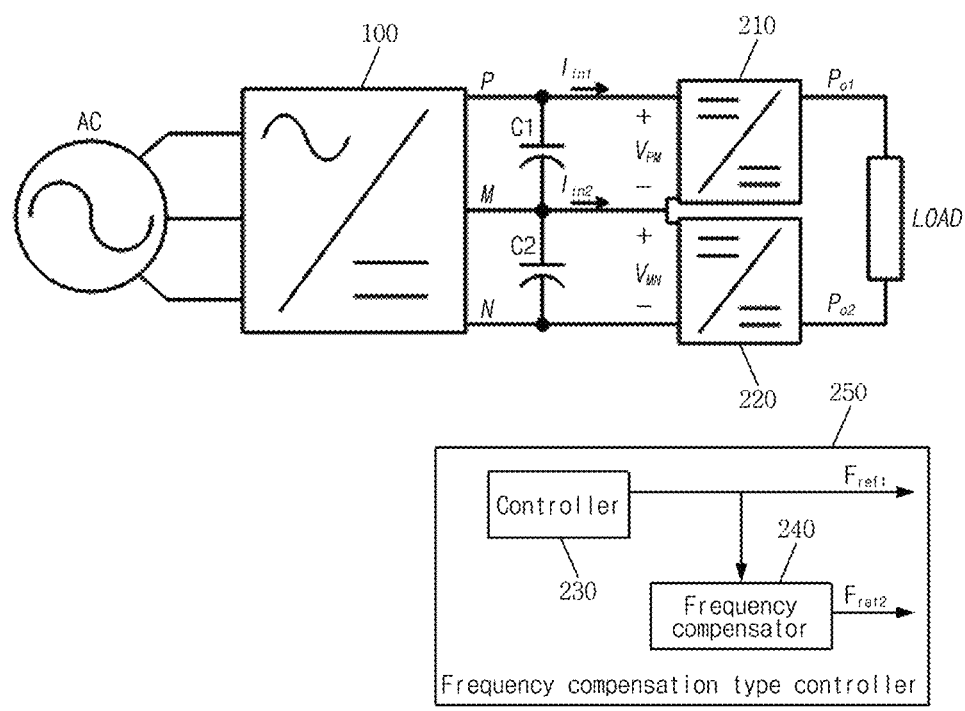
FIG. 3 is a block diagram illustrating a circuit for preventing power imbalance of a resonance-type power converter according to an embodiment of the present disclosure.

FIG. 1 is a block diagram illustrating a typical resonance-type power converter, and FIG. 2 is a block diagram illustrating a high-frequency inverter included in a typical resonance-type power converter.

Referring to FIG. 1, the typical resonance-type power converter includes a rectifier 100, a first capacitor C1, a second capacitor C2, a first resonant converter module 210, a second resonant converter module 220, and a controller 230.

The rectifier 100 converts input alternating current AC into direct current. The first capacitor C1 is connected between a positive output node P and a neutral point output node M of the rectifier 100, and the second capacitor C2 is connected between the neutral point output node M and a ground node N. Therefore, the output voltage of the rectifier 100 is divided into two stages by the first capacitor C1 and the second capacitor C2.

The frequency-controlled first resonant converter module 210 is connected to both ends of the first capacitor C1, and the frequency-controlled second resonant converter module 220 is connected to both ends of the second capacitor C2. A load is connected between the output terminals of the first and second resonant converter modules 210 and 220. Therefore, the voltage supplied to both ends of the load is determined by the output voltages of the first and second resonant converter modules 210 and 220.

Each of the first and second resonant converter modules 210 and 220 includes a switching unit that switches the input direct current voltage and converts it into alternating current voltage. The switching unit is provided with MOS transistors as switching elements. The MOS transistor is switched by a pulse width modulation (PWM) signal supplied to its gate.

The controller 230 outputs first and second frequency commands $F_{ref1}$ and $F_{ref2}$ for controlling the frequencies of the PWM signals supplied to the switching units of the first and second resonant converter modules 210 and 220, respectively.

Referring to FIG. 2, the controller 230 includes a first subtractor 231, a first PI controller 232, and a current controller 233.

The first subtractor 231 obtains a difference between a reference voltage $V_{ref}$ and an output voltage $V_O$ supplied to the load and outputs an error voltage $V_{err}$ accordingly. The first PI controller 232 proportionally integrates the error voltage $V_{err}$ and outputs a reference current $I_{ref}$ accordingly.

The current controller 233 generates the first and second frequency commands $F_{ref1}$ and $F_{ref2}$ from the reference current $I_{ref}$. For this purpose, the current controller 233 includes a second subtractor 233A and a second PI controller 233B.

The second subtractor 233A obtains a difference between the reference current $I_{ref}$ and an output current $I_O$ supplied to the load and outputs an error current $I_{err}$ accordingly. The second PI controller 233B proportionally integrates the error current $I_{err}$ and outputs the first and second frequency commands $F_{ref1}$ and $F_{ref2}$ accordingly. Here, the first and second frequency commands $F_{ref1}$ and $F_{ref2}$ are output as the same value.

As such, in the typical resonance-type power converter, the values of the first and second frequency commands supplied from the controller to the switching units of the frequency-controlled first and second resonant converter modules are the same. However, the first and second resonant converter modules do not have the same characteristics due to the turn ratio of the transformer, manufacturing tolerance of the resonant network, etc., so when they are switched with the same frequency command, a problem occurs that they are not controlled with the same power.

Now, embodiments of the present disclosure will be described in detail with reference to the accompanying drawings. However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Additionally, the terms including expressions "first", "second", etc. are used for merely distinguishing one element from other elements and do not limit the corresponding elements. Also, these ordinal expressions do not intend the sequence and/or importance of the elements. In addition, the singular expressions may include plural expressions unless the context clearly dictates otherwise.

Figure 4:
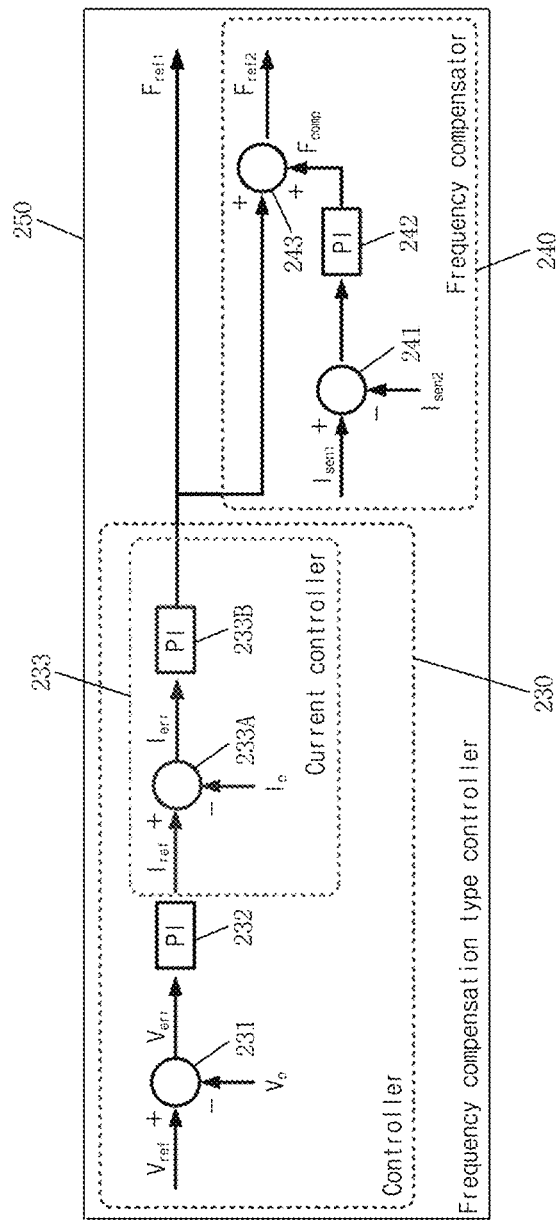
FIG. 4 is a block diagram illustrating a frequency compensation type controller.
Figure 5:
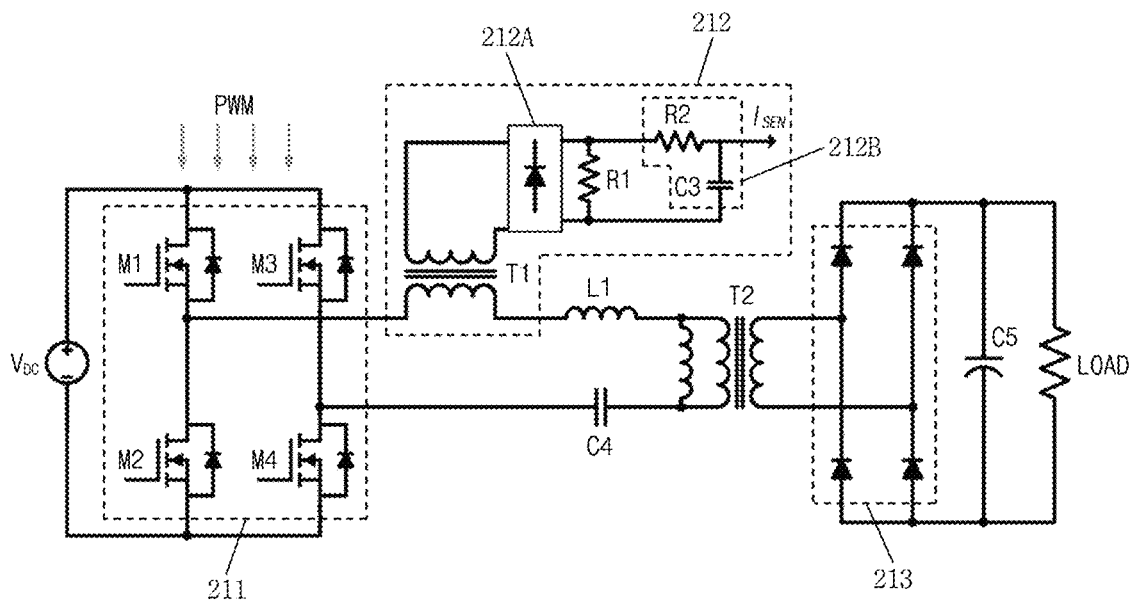
FIG. 5 is a circuit diagram illustrating an installation example of a current sensor.

FIG. 3 is a block diagram illustrating a circuit for preventing power imbalance of a resonance-type power converter according to an embodiment of the present disclosure. FIG. 4 is a block diagram illustrating a frequency compensation type controller. FIG. 5 is a circuit diagram illustrating an installation example of a current sensor.

Referring to FIG. 3, the power imbalance prevention circuit of the resonance-type power converter according to the present disclosure includes a rectifier 100, a first capacitor C1, a second capacitor C2, a first resonant converter module 210, a second resonant converter module 220, and a frequency compensation type controller 250.

The operation of the power imbalance prevention circuit shown in FIG. 3 will be described below with reference to FIGS. 4 and 5.

Compared to FIG. 1 described above, except for the frequency compensation type controller 250 of FIG. 3, the configuration and operation of other components are the same.

That is, the rectifier 100 converts input alternating current AC into direct current. The first capacitor C1 is connected between a positive output node P and a neutral point output node M of the rectifier 100, and the second capacitor C2 is connected between the neutral point output node M and a ground node N. Therefore, the output voltage of the rectifier 100 is divided into two stages by the first capacitor C1 and the second capacitor C2.

The frequency-controlled first resonant converter module 210 is connected to both ends of the first capacitor C1, and the frequency-controlled second resonant converter module 220 is connected to both ends of the second capacitor C2. A load is connected between the output terminals of the first and second resonant converter modules 210 and 220. Therefore, the voltage supplied to both ends of the load is determined by the output voltages of the first and second resonant converter modules 210 and 220.

Each of the first and second resonant converter modules 210 and 220 includes a switching unit that switches the input direct current voltage. The switching unit is provided with metal oxide semiconductor (MOS) transistors as switching elements. The MOS transistor is switched by a pulse width modulation (PWM) signal supplied to its gate.

The frequency compensation type controller 250 outputs first and second frequency commands $F_{ref1}$ and $F_{ref2}$ for controlling the frequencies of the PWM signals supplied to the switching units of the first and second resonant converter modules 210 and 220, respectively. At this time, in order to eliminate power imbalance between the first and second resonant converter modules 210 and 220, in particular, the frequency compensation type controller 250 compensates and then outputs the second frequency command.

Referring to FIG. 4, the frequency compensation type controller 250 includes a controller 230 and a frequency compensator 240.

The controller 230 is the same as the controller in FIGS. 1 and 2 and includes a first subtractor 231, a first proportional-integral (PI) controller 232, and a current controller 233.

The first subtractor 231 obtains a difference between a reference voltage $V_{ref}$ and an output voltage $V_O$ supplied to the load and outputs an error voltage $V_{err}$ accordingly. The first PI controller 232 proportionally integrates the error voltage $V_{err}$ and outputs a reference current $I_{ref}$ accordingly.

The current controller 233 generates the first frequency command $F_{ref1}$ from the reference current $I_{ref}$. For this purpose, the current controller 233 includes a second subtractor 233A and a second PI controller 233B.

The second subtractor 233A obtains a difference between the reference current $I_{ref}$ and an output current $I_O$ supplied to the load and outputs an error current $I_{err}$ accordingly. The second PI controller 233B proportionally integrates the error current $I_{err}$ and outputs the first frequency command $F_{ref1}$ accordingly.

The frequency compensator 240 compensates for the first frequency command $F_{ref1}$ based on the output current of the switching unit and outputs the second frequency command $F_{ref2}$ accordingly. Hereinafter, this will be described in more detail.

The frequency compensator 240 includes a third subtractor 241, a third PI controller 242, and an adder 243.

The third subtractor 241 obtains a difference between a first sensing current $I_{sen1}$ and a second sensing current $I_{sen2}$. Here, the first sensing current $I_{sen1}$ is sensed through a first sensing circuit 212 of FIG. 5.

Referring to FIG. 5, the first resonant converter module 210 includes a first switching unit 211 and a first sensing circuit 212.

The first switching unit 211 includes a pair of first and second MOS transistors M1 and M2 and a pair of third and fourth MOS transistors M3 and M4, each pair connected in series between positive and negative terminals of a DC power supply $V_{DC}$.

The first to fourth MOS transistors M1-M4 convert DC voltage to AC voltage by performing a switching operation according to the PWM signal supplied to each gate.

A transformer T2 is driven by the converted AC voltage. AC voltage that appears in a secondary coil of the transformer T2 is full-wave rectified by a bridge circuit 213 and smoothed by a capacitor C5, so that DC voltage is supplied to the load.

The first sensing circuit 212 is connected to the output terminal of the first switching unit 211 and outputs the first sensing current $I_{sen1}$.

For this purpose, the first sensing circuit 212 includes a first current transformer T1, a diode rectifier 212A, a resistor R1, and an RC filter 212B.

The first current transformer T1 is driven by the output current of the first switching unit 211. The diode rectifier 212A converts an AC component output through the first current transformer T1 into a DC component. The RC filter 212B extracts an average value of the DC component output from the diode rectifier 212A and outputs it as the first sensing current $I_{sen1}$. Accordingly, the first sensing current $I_{sen1}$ is a value representing the DC component corresponding to a peak value of a primary resonance current of the first current transformer T1.

The second resonant converter module 220 includes a second switching unit and a second sensing circuit that are the same as the first switching unit 211 and the first sensing circuit 212. Thus, the second sensing circuit outputs the second sensing current $I_{sen2}$.

Returning to FIG. 4, the third PI controller 242 proportionally integrates the difference between the first sensing current $I_{sen1}$ and the second sensing current $I_{sen2}$ output from the third subtractor 241 and outputs a frequency compensation component $F_{comp}$.

The fourth adder 243 adds the frequency compensation component $F_{comp}$ to the first frequency command $F_{ref1}$ and outputs the second frequency command $F_{ref2}$ accordingly.

As a result, the second frequency command $F_{ref2}$ has a difference equal to the frequency compensation component $F_{comp}$ compared to the first frequency command $F_{ref1}$.

Therefore, the frequency of the PWM signal supplied to the switching unit 211 of the first resonant converter module 210 is determined by the first frequency command $F_{ref1}$, and the frequency of the PWM signal supplied to the switching unit of the second resonant converter module 220 is determined by the second frequency command $F_{ref2}$.

As a result, it is possible to eliminate the imbalance of output power between the first resonant converter module 210 and the second resonant converter module 220.

This imbalance removal technique can be applied to both analog/digital control methods such as analog control ICs and digital control units, and is not affected by the converter's serial/parallel output configuration.

Figure 6:
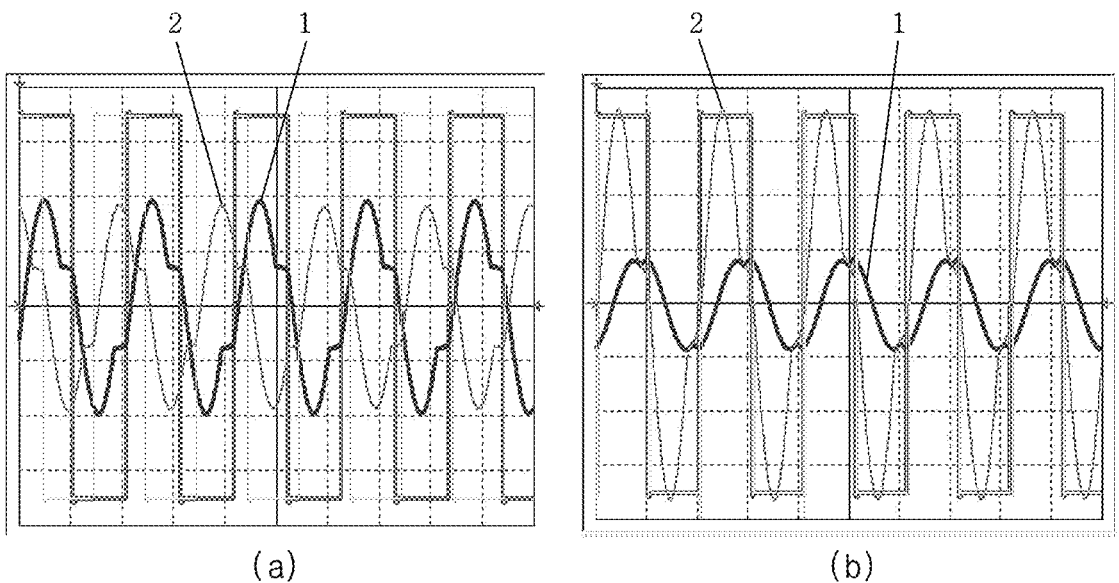
FIG. 6 shows a comparison of the waveforms of a resonance-type converter according to the present disclosure and a typical resonance-type converter.

FIG. 6 shows a comparison of the waveforms of a resonance-type converter according to the present disclosure and a typical resonance-type converter.

In FIG. 6, reference numerals 1 and 2 indicate the purple waveforms of the primary currents of the first and second resonant converter modules 210 and 220, respectively. In (a) of FIG. 6, it can be seen that the same amount of current flows through the first and second resonant converter modules 210 and 220, thereby eliminating the imbalance. However, in (b) of FIG. 6, it can be seen that a large current imbalance occurs when controlled at the same frequency.

Figure 7:
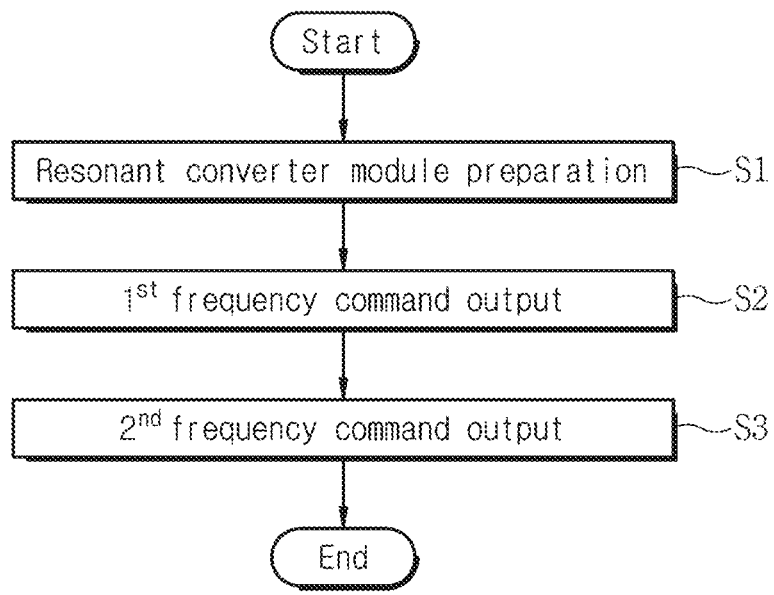
FIG. 7 is a flowchart illustrating a method for preventing power imbalance of a resonance-type power converter.

FIG. 7 is a flowchart illustrating a method for preventing power imbalance of a resonance-type power converter.

Referring to FIG. 7, the method for preventing power imbalance of a resonance-type power converter according to an embodiment of the present disclosure includes a resonant converter module preparation step S1, a first frequency command output step S2, and a second frequency command output step S3.

This method is described with reference to FIG. 3.

In the resonant converter module preparation step S1, the frequency-controlled first and second resonant converter modules 210 and 220 that divide the output voltage of the rectifier 100 into two stages are prepared.

In the first frequency command output step S2, the controller 230 of the frequency compensation type controller 250 outputs the first frequency command $F_{ref1}$ for controlling the frequency of the PWM signal supplied to the switching element of the switching unit of the first resonant converter module 210.

In the second frequency command output step S3, the frequency compensator 240 of the frequency compensation type controller 250 compensates for the first frequency command $F_{ref1}$ and then outputs the second frequency command $F_{ref2}$ in order to remove the power imbalance between the first and second resonant converter modules 210 and 220.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A circuit for preventing power imbalance of a resonance-type power converter, comprising:
   a rectifier configured to convert input alternating current (AC) into direct current (DC);
   frequency-controlled first and second resonant converter modules configured to receive an output voltage of the rectifier divided into two stages;
   a controller configured to output a first frequency command for controlling a frequency of a pulse width modulation (PWM) signal supplied to a switching element of a first switching unit of the first resonant converter module; and
   a frequency compensator configured to compensate for the first frequency command and then output a second frequency command for controlling a frequency of a PWM signal supplied to a switching element of a second switching unit of the second resonant converter module, so as to eliminate power imbalance between the first and second resonant converter modules,
   wherein the frequency compensator includes:
      a subtractor configured to obtain a difference between a first sensing current sensed from the first switching unit of the first resonant converter module and a second sensing current sensed from the second switching unit of the second resonant converter module;
      a proportional-integral (PI) controller configured to proportionally integrate the difference and output a frequency compensation component accordingly; and
      an adder configured to add the frequency compensation component to the first frequency command and output the second frequency command accordingly,
   wherein the first sensing current is configured to be sensed by a first sensing circuit connected to an output terminal of the first switching unit of the first resonant converter module,
   wherein the second sensing current is configured to be sensed by a second sensing circuit connected to an output terminal of the second switching unit of the second resonant converter module, and
   wherein the first sensing circuit and the second sensing circuit have same configuration, and each of the first and second sensing circuits includes:
      a current transformer configured to be driven by an output current of the respective first or second switching unit;
      a diode rectifier configured to convert an AC component output through the current transformer into a DC component; and
      an RC filter configured to extract an average value of the DC component output from the diode rectifier and output the respective first or second sensing current.

2. The circuit of claim 1, wherein the respective first or second sensing current is a value representing the DC component corresponding to a peak value of a primary resonance current of the current transformer.

3. A method for preventing power imbalance of a resonance-type power converter, comprising:
   dividing, at frequency-controlled first and second resonant converter modules, an output voltage of a rectifier into two stages;
   outputting, at a controller of a frequency compensation type controller, a first frequency command for controlling a frequency of a pulse width modulation (PWM) supplied to a switching element of a first switching unit of the first resonant converter module; and
   at a frequency compensator of the frequency compensation type controller, compensating for the first frequency command and then outputting a second frequency command for controlling a frequency of a PWM signal supplied to a switching element of a second switching unit of the second resonant converter module in order to remove power imbalance between the first and second resonant converter modules,
   wherein the frequency compensator includes:
      a subtractor configured to obtain a difference between a first sensing current sensed from the first switching unit of the first resonant converter module and a second sensing current sensed from the second switching unit of the second resonant converter module;
      a proportional-integral (PI) controller configured to proportionally integrate the difference and output a frequency compensation component accordingly; and
      an adder configured to add the frequency compensation component to the first frequency command and output the second frequency command accordingly,
   wherein the first sensing current is configured to be sensed by a first sensing circuit connected to an output terminal of the first switching unit of the first resonant converter module,
   wherein the second sensing current is configured to be sensed by a second sensing circuit connected to an output terminal of the second switching unit of the second resonant converter module, and
   wherein the first sensing circuit and the second sensing circuit have same configuration, and each of the first and second sensing circuits includes:
      a current transformer configured to be driven by an output current of the respective first or second switching unit;
      a diode rectifier configured to convert an AC component output through the current transformer into a DC component; and
      an RC filter configured to extract an average value of the DC component output from the diode rectifier and output the respective first or second sensing current.

* * * * *